United States Patent
Qi et al.

(10) Patent No.: US 11,777,636 B2
(45) Date of Patent: Oct. 3, 2023

(54) JOINT LINK-LEVEL AND NETWORK-LEVEL INTELLIGENT SYSTEM AND METHOD FOR DYNAMIC SPECTRUM ANTI-JAMMING

(71) Applicant: NANJING UNIVERSITY OF AERONAUTICS AND ASTRONAUTICS, Nanjing (CN)

(72) Inventors: Nan Qi, Nanjing (CN); Luliang Jia, Nanjing (CN); Diliao Ye, Nanjing (CN); Qihui Wu, Nanjing (CN); Xiaojie Li, Nanjing (CN); Yijia Liu, Nanjing (CN); Wei Wang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/901,871

(22) Filed: Sep. 2, 2022

(65) Prior Publication Data
US 2022/0416932 A1    Dec. 29, 2022

Related U.S. Application Data

(63) Continuation-in-part of application No. PCT/CN2021/132261, filed on Nov. 23, 2021.

(30) Foreign Application Priority Data

Dec. 18, 2020    (CN) .......................... 202011503111.6

(51) Int. Cl.
*H04K 3/00*    (2006.01)
(52) U.S. Cl.
CPC .................. *H04K 3/224* (2013.01)

(58) Field of Classification Search
CPC .......... H04K 3/224; H04K 3/22; H04K 3/226; H04K 3/20; H04K 3/00
See application file for complete search history.

(56) References Cited

U.S. PATENT DOCUMENTS

2020/0153535 A1*  5/2020 Jayaweera Kankanamge ............
                                                                G06V 10/82
2020/0187014 A1   6/2020 Sevindik

FOREIGN PATENT DOCUMENTS

| CN | 109274456 A | 1/2019 |
| CN | 109600190 A | 4/2019 |

(Continued)

*Primary Examiner* — Keith Ferguson
(74) *Attorney, Agent, or Firm* — Bayramoglu Law Offices LLC

(57) ABSTRACT

A joint link-level and network-level intelligent system and method for dynamic spectrum anti-jamming are provided. The system includes a link-level anti-jamming subsystem and a network-level anti-jamming subsystem. The link-level anti-jamming subsystem sets a reward value as system transmission throughput in a single decision cycle, and a user makes an intelligent frequency usage decision based on the obtained reward value to skip a frequency band in which jamming exists. The network-level anti-jamming subsystem performs reasonable frequency band allocation and management for lower-level sub-users when link-level anti-jamming fails to further enhance a frequency domain anti-jamming capability of the entire system. The users make intelligent frequency usage decisions through a dynamic spectrum anti-jamming algorithm based on reinforcement learning to effectively avoid external malicious jamming, realize dynamic spectrum access, and enhance a frequency domain anti-jamming capability of the system.

11 Claims, 8 Drawing Sheets

(56) References Cited

FOREIGN PATENT DOCUMENTS

| | | | |
|---|---|---|---|
| CN | 110380802 | A | 10/2019 |
| CN | 110891276 | A | 3/2020 |
| CN | 111917509 | A | 11/2020 |
| CN | 111970072 | A | 11/2020 |
| CN | 112752311 | A | 5/2021 |

* cited by examiner

JOINT LINK-LEVEL AND NETWORK-LEVEL INTELLIGENT SYSTEM AND METHOD FOR DYNAMIC SPECTRUM ANTI-JAMMING

CROSS REFERENCE TO THE RELATED APPLICATIONS

This application is a continuation-in-part application of International Application No. PCT/CN2021/132261, filed on Nov. 23, 2021, which is based upon and claims priority to Chinese Patent Application No. 202011503111.6, filed on Dec. 18, 2020, the entire contents of which are incorporated herein by reference.

TECHNICAL FIELD

The present disclosure belongs to the field of communication countermeasure technologies, and specifically to a joint link-level and network-level intelligent system and method for dynamic spectrum anti-jamming.

BACKGROUND

In the field of modern wireless communication, the development of wireless communication technologies and the increase of wireless devices strain the available wireless spectrum resources, which increase both the external jamming of the communication system and the mutual jamming among system users. Therefore, studying the intelligent anti-jamming technologies in the new jamming environment is important to figure out reliable transmission of wireless communication.

In military wireless communication, commanding communications, military intelligence, and weapons control all depend on electronic devices, especially radio devices. The anti-jamming communication capability in the harsh electromagnetic environment is an important factor in winning modern warfare and is also an important feature of battlefield survivability. In addition, information warfare and electronic warfare have become important warfare forms in the new era. Therefore, suitable anti-jamming methods are needed to ensure the normal operation of communication systems in order to improve the transmission reliability of communication systems against various forms of jamming.

The research on communication anti-jamming has a long history, and the traditional anti-jamming technologies mainly include the jamming avoidance technology and the jamming mitigation technology. The jamming avoidance technology deals with jamming through avoiding, such as frequency hopping in the frequency domain or time hopping in the time domain.

Traditional frequency domain anti-jamming methods such as frequency hopping and spread spectrum have the following shortcomings and are unable to meet the requirements of new anti-jamming technologies: 1) The traditional technologies such as frequency hopping and spread spectrum have a single anti-jamming mode and work in a fixed pattern. Consequently, it is easy for the enemy to learn the rules and then implement targeted jamming, causing low spectrum utilization. 2) The existing dynamic spectrum anti-jamming algorithms are mostly researched through software simulation without sufficient research in the actual communication environment and verification of the anti-jamming algorithms on the software defined radio platform. 3) The existing dynamic spectrum anti-jamming technologies deal with jamming on the user link level. However, in the real-world scenario, communication between the communication pair is interrupted in case of strong wideband jamming, and the updated communication frequency information cannot be exchanged internally, that is, the link-level autonomous frequency usage decision fails. In this case, a network-level anti-jamming scheme needs to be introduced, but no relevant design has been found.

SUMMARY

In view of the shortcomings of the existing technologies, the present disclosure provides a joint link-level and network-level intelligent system and method for dynamic spectrum anti-jamming to improve the overall anti-jamming performance of a wireless communication network, and thus improve the system throughput of the wireless communication network.

To achieve the above objective, the present disclosure adopts the following technical solution:

A joint link-level and network-level intelligent system for dynamic spectrum anti-jamming includes a link-level anti-jamming subsystem and a network-level anti-jamming subsystem, where the link-level anti-jamming subsystem sets a reward value as system transmission throughput in a single decision cycle, and a user makes an intelligent frequency usage decision based on the obtained reward value to skip a frequency band in which jamming exists, so as to avoid impact of external malicious jamming.

The network-level anti-jamming subsystem performs reasonable frequency band allocation and management for lower-level sub-users when link-level anti-jamming fails to further enhance a frequency domain anti-jamming capability of the entire system.

Corresponding packet and unpacket modules are provided at a frequency management center and sub-user nodes to guarantee smooth information transmission.

In order to optimize the above technical solution, the present disclosure further includes:

The link-level anti-jamming subsystem includes one transmitter provided at a learning node, one receiver provided at a cognitive node, and one jammer, where the jammer is configured to generate swept, comb and random jamming signals.

The transmitter and the receiver transmit a data frame through a data link and transmit control information through a control link.

The receiver obtains channel information through the control link and wideband spectrum sensing and uses the information to execute a reinforcement learning algorithm to optimize a channel selection strategy.

The link-level anti-jamming subsystem adopts a laboratory virtual instrument engineering workbench (LabVIEW) development environment and uses a universal software radio peripheral (USRP) device for wireless signal transmission and jamming signal generation.

The frequency management center communicates with the lower-level sub-users through a frequency management chain network.

The frequency management center, a USRP transmitter, and a USRP receiver are all connected to a frequency management chain device through the Ethernet. Frequency management messages generated by the frequency management center, the USRP transmitter, and the USRP receiver are transmitted in user datagram protocol (UDP) packets on an Ethernet link.

The network-level anti-jamming subsystem includes an upper-level frequency management center, and the upper-level frequency management center learns available spectrum resources in an environment through wideband spectrum sensing, and then confirms requirements of the lower-level sub-users.

A sub-user node sends a frequency usage coordination request to the frequency management center when the link-level anti-jamming fails, that is, when an allocated spectrum resource cannot meet communication needs of the sub-user node. The frequency management center allocates the spectrum resources for all of the sub-users after receiving the frequency usage coordination request, sends an allocation scheme to the corresponding sub-user node, and establishes a backup spectrum resource pool with unused resources to handle needs of a sub-user node with an exceptional case.

A joint link-level and network-level intelligent method for dynamic spectrum anti-jamming includes:

Step 1: When the lower-level sub-user is subject to jamming, sensing, by the link-level anti-jamming subsystem, a gain of each frequency band in the environment through a wideband spectrum sensing machine to obtain a jamming strength in the current environment, learning a frequency hopping pattern of the jamming through the reinforcement learning algorithm, and setting a reward value of a communicating user as system transmission throughput in the single decision cycle.

Step 2: upgrading, by the system to joint link-level and network-level anti-jamming, that is, applying, by the lower-level sub-user, to the upper-level frequency management center of the network-level anti-jamming subsystem for an autonomous decision of frequency usage coordination when a link-level autonomous frequency usage decision fails, to be specific, communication of the lower-level sub-user is interrupted in case of strong wideband jamming, and even the intelligent frequency usage decision made by the link-level anti-jamming subsystem cannot avoid the impact of the jamming, and updated communication frequency information cannot be internally exchanged.

Step 3: sensing, by the frequency management center, available spectrum resources in the entire environment, then activating a pre-decided spare spectrum, allocating the frequency band to the lower-level sub-user, and using a dedicated channel to inform each of two users in a lower-level communication pair of a new link-building frequency.

The step 3 may include the following steps:

step 3.1: presetting, by the frequency management center and the link-level communication sub-user, a format of exchanged information and setting, packet and unpacket interfaces uniformly based on the set format;

step 3.2: registering each sub-user;

step 3.3: processing an update request message; and step 3.4: performing a frequency management policy and frequency usage coordination.

In the step 3.3, when a communication node makes an autonomous decision, the receiver receives the update request message sent by the frequency management center through the frequency management chain network, where the update request message is used by the frequency management center to request an updated frequency usage status from the receiver. When no monitoring or frequency usage status message is received from a platform after expiration time, the update request message is sent for the platform, and then the receiver sends a monitoring result message and a frequency usage status message to the frequency management chain device.

In the step 3.4, the transmitter needs to send a frequency usage coordination message to the frequency management center through the frequency management chain network to inform the frequency management center of a current link-level jamming degree. In addition, when link-level communication is seriously jammed, the transmitter actively sends a coordination request message to the frequency management center through the frequency management chain network. When receiving the frequency usage coordination message from the transmitter, the frequency management center needs to determine whether to decide a new available link-level frequency band based on the link-level jamming degree; and when decision is needed, a frequency management policy message is sent to the receiver and the transmitter through the frequency management chain network, and the receiver and the transmitter use an intelligent learning method to make an autonomous anti-jamming decision in new spectrum resources based on the frequency management policy message.

The present disclosure has the following beneficial effects:

(1) Through the dynamic spectrum access method based on intelligent learning, the users learn a frequency hopping pattern of malicious jamming and make intelligent decisions on the optimal frequency band for information transmission to avoid external malicious jamming and improve the frequency domain anti-jamming performance of the system.

(2) Through the joint link-level and network-level spectrum resource management, when the current decided frequency band is completely jammed, the user sends a frequency usage coordination request to the frequency management center, and the frequency management center re-allocates a spare spectrum resource for the user, thereby further improving the frequency domain anti-jamming performance of the system.

(3) The effectiveness of the designed anti-jamming system is verified on the USRP software defined radio platform, which is reconfigurable, flexible and easy for operation, and can overcome the shortcomings of traditional communication experimental simulation methods, such as poor scalability of the curing test chamber and non-objective software simulation results.

DETAILED DESCRIPTION OF THE EMBODIMENTS

The embodiments of the present disclosure are further described in detail below with reference to the accompanying drawings.

A joint link-level and network-level intelligent system for dynamic spectrum anti-jamming includes a link-level anti-jamming subsystem and a network-level anti-jamming subsystem and is designed and implemented based on the LabVIEW and USRP software defined radio platform.

Figure 1:
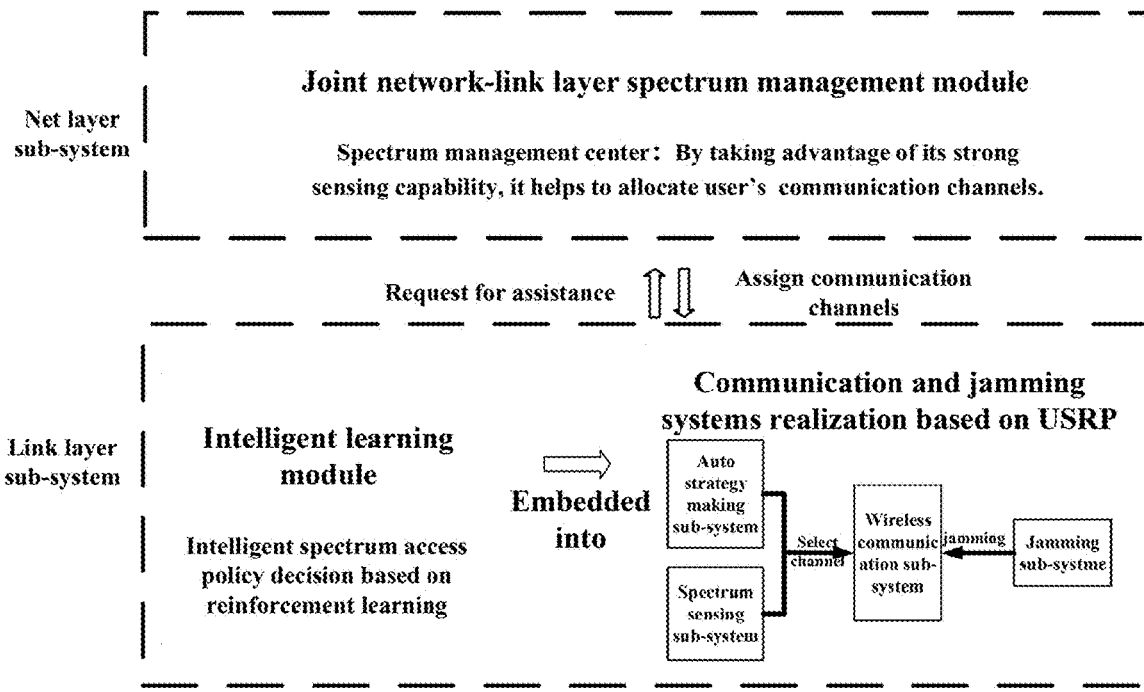
FIG. 1 is a structural diagram of a system according to the present disclosure.

As shown in FIG. 1, the network-level anti-jamming subsystem performs reasonable frequency band allocation and management for lower-level sub-users when link-level anti-jamming against strong wideband jamming fails to further enhance a frequency domain anti-jamming capability of the entire system.

Figure 2:
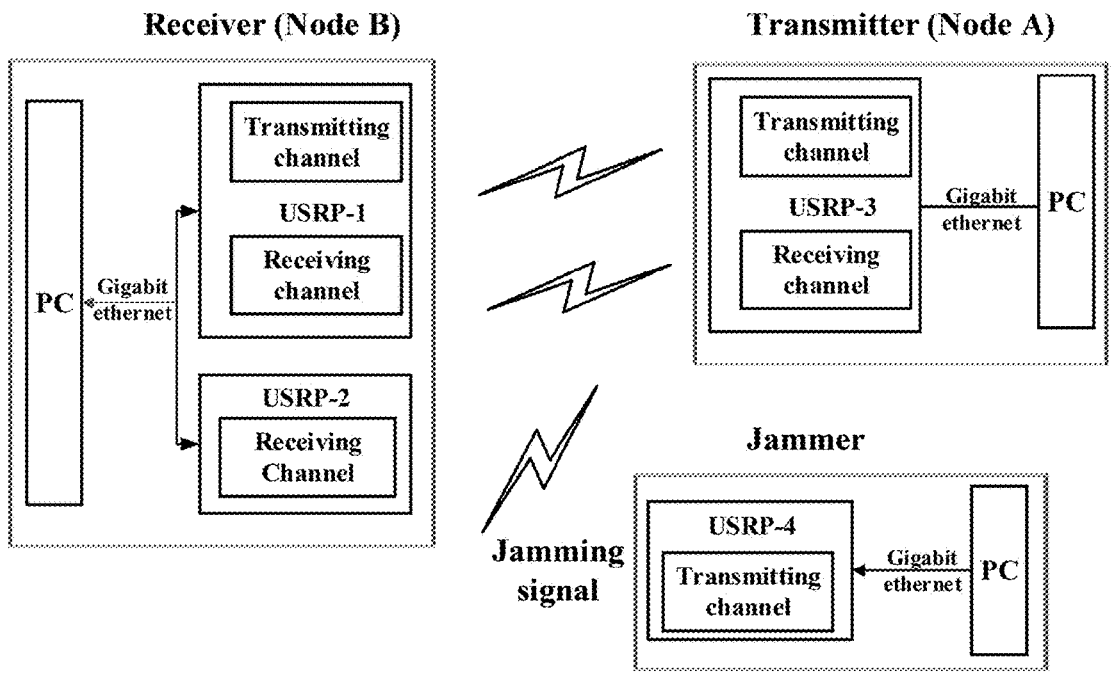
FIG. 2 is a schematic diagram of a USRP platform of a transmitter, a receiver, and a jammer according to the present disclosure.

As shown in FIG. 2, the link-level anti-jamming subsystem sets a reward value as system transmission throughput in a single decision cycle, and a user makes an intelligent frequency usage decision based on the obtained reward value to skip a frequency band in which jamming exists, so as to avoid impact of external malicious jamming.

Corresponding packet and unpacket modules are provided at a frequency management center and sub-user nodes to guarantee smooth information transmission.

In this embodiment, the link-level anti-jamming subsystem includes one transmitter provided at a learning node, one receiver provided at a cognitive node, and one jammer.

The jammer is configured to generate swept, comb and random jamming signals that change quickly.

The transmitter and the receiver transmit a data frame through a data link and transmit control information through a control link.

The receiver obtains channel information through the control link and wideband spectrum sensing and uses the information to execute a reinforcement learning algorithm to optimize a channel selection strategy.

In this embodiment, the link-level anti-jamming subsystem adopts a LabVIEW development environment and uses a USRP device for wireless signal transmission and jamming signal generation.

The frequency management center communicates with frequency service devices through a frequency management chain network.

The frequency management center, a USRP transmitter, and a USRP receiver are all connected to a frequency management chain device through the Ethernet. Frequency management messages generated by the frequency management center, the USRP transmitter, and the USRP receiver are transmitted in UDP packets on an Ethernet link.

In this embodiment, the network-level anti-jamming subsystem includes an upper-level frequency management center. The upper-level frequency management center learns available spectrum resources in an environment through wideband spectrum sensing, and then confirms requirements of the lower-level sub-users.

A sub-user node sends a frequency usage coordination request to the frequency management center when the link-level anti-jamming against strong wideband jamming fails, that is, when an allocated spectrum resource cannot meet communication needs of the sub-user node. The frequency management center allocates the spectrum resources for all the sub-users after receiving the frequency usage coordination request, sends an allocation scheme to the corresponding sub-user node, and establishes a backup spectrum resource pool with unused resources to handle needs of a sub-user node with an exceptional case.

1) Sense available spectrum resources in a current environment and establish a spectrum resource pool.

2) Make autonomous frequency usage decisions on spectrum resources used by the sub-user nodes based on the needs of the lower-level sub-user nodes.

3) Reserve sufficient spare spectrum resources for allocation to a sub-user node with an exceptional case and use a dedicated channel to inform each of two users in a lower-level communication pair of a new link-building frequency, so as to restore the link-level user communication process. The task of the link-level anti-jamming subsystem is to complete link communication and feed back the obtained spectrum resources and a demand matching status to the frequency management center.

Figure 3:
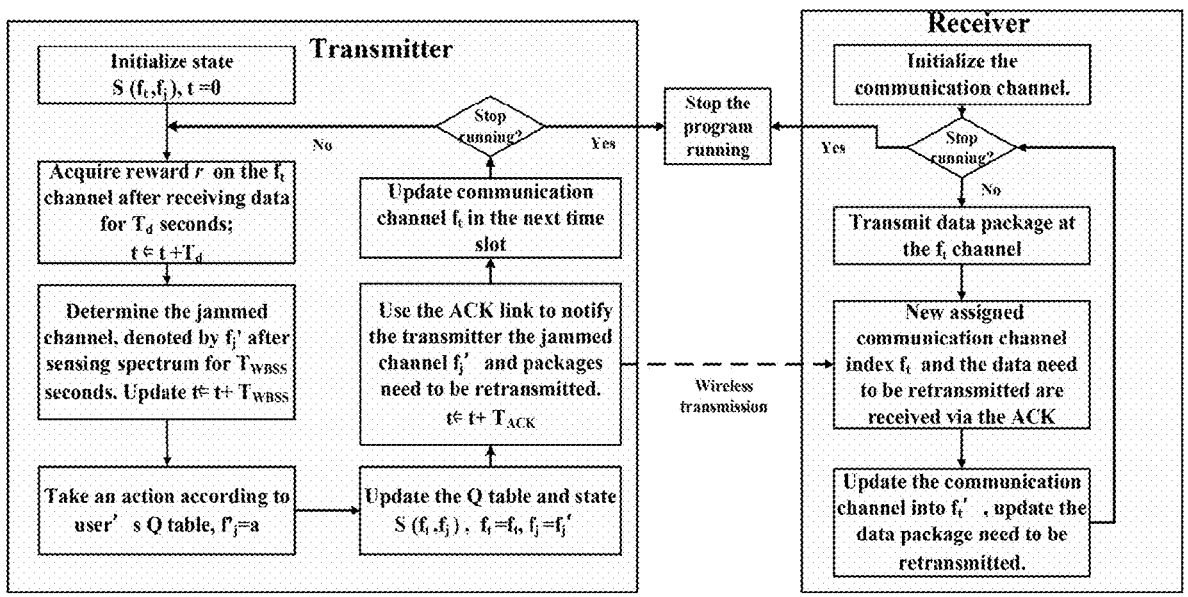
FIG. 3 is a flowchart of implementing user dynamic spectrum anti-jamming based on reinforcement learning according to the present disclosure.

As shown in FIG. 3, a joint link-level and network-level intelligent method for dynamic spectrum anti-jamming includes:

Step 1: When a lower-level sub-user is subject to jamming, the link-level anti-jamming subsystem senses a gain of each frequency band in the environment through a wideband spectrum sensing machine to obtain a jamming strength in the current environment, learns a frequency hopping pattern of the jamming through the reinforcement learning algorithm, and sets a reward value of a communicating user as system transmission throughput in the single decision cycle.

Step 2: The system upgrades to joint link-level and network-level anti-jamming, that is, the lower-level sub-user applies to the upper-level frequency management center of the network-level anti-jamming subsystem for an autonomous decision of frequency usage coordination when a link-level autonomous frequency usage decision fails; to be specific, communication of the lower-level sub-user is interrupted in case of strong wideband jamming and even the intelligent frequency usage decision made by the link-level anti-jamming subsystem cannot avoid impact of the jamming, and updated communication frequency information cannot be internally exchanged.

Step 3: The frequency management center senses available spectrum resources in the entire environment, activates a pre-decided spare spectrum, allocates the frequency band to the lower-level sub-user, and uses a dedicated channel to inform each of two users in a lower-level communication pair of a new link-building frequency.

In this embodiment, the step 1 may specifically include:

Step 1.1: Define a user state, a decision action, and a channel selection probability vector.

An initial state of the user is set to $S(f_i, f_j)$, and the receiver receives data in a time $T_d$ on a channel $f_i$, then calculates a reward value r to measure transmission quality of the channel $f_i$, and obtains a current jammed channel $f_j'$ through a wideband spectrum sensing time $T_{WBSS}$.

A user state in a slot k is defined as $S(f_r(k), f_j(k))$, where $f_r(k)$ is a current operating channel, $f_j(k)$ is a jammed channel, and $f_r(k), f_j(k) \in M$.

A decision action $a(k+1)=f_r(k+1)$, $f_j(k+1) \in M$ made in the slot k is defined as an operating channel of a next slot.

A channel selection probability vector of the user in the slot k is denoted as $P(k)=(p_1(k), \ldots, p_M(k))$.

Step 1.2: The user updates and maintains a Q table based on reinforcement learning, evaluates each action in different states, and continuously updates the Q table as the user interacts with the environment until the end of reinforcement learning.

In any slot k, the Q table is updated through the formula:

$$Q_{k+1}(S_k, a_{k+1}) = Q_k(S_k, a_{k+1}) + \alpha(r_k \gamma \cdot \Phi - Q_k(S_k, a_{k+1}))$$

$\alpha$ is a learning rate, $\gamma$ is a discount factor, $r_k$ is an immediate reward value of a current state $S_k$, $\Phi$ is the maximum Q value of all actions in a state $S_{k+1}$, that is, the maximum benefit in the memory of the agent.

The agent selects and executes an action $a_{k+1}$ and reaches the state $S_{k+1}$ in a slot k+1. The calculation formulas of $r_k$ and $\Phi$ are as follows:

$$r_k = \frac{T_{succ}}{T_S}, \Phi = \max Q_k(S_{k-1}, \tilde{a}), \forall \tilde{a} \in M$$

$T_{SUCC}$ is the successful transmission time (uninterrupted) within a slot length $T_S$, and $\tilde{a}$ is an optional channel in the state $S_{k+1}$.

Step 1.3: Update the channel selection probability vector based on the Q table.

The channel selection probability vector $P(k)=(p_1(k), \ldots, p_M(k))$ is updated through the formula:

$$p_m(k+1) = \frac{\exp(\beta Q(S_k, m))}{\sum_{m \in M} \exp(\beta Q(S_k, m))}, \forall m \in M$$

$\beta$ is the Boltzmann constant and $p_m(k+1)$ is a probability of selecting a channel m in the slot k+1.

Figure 5:
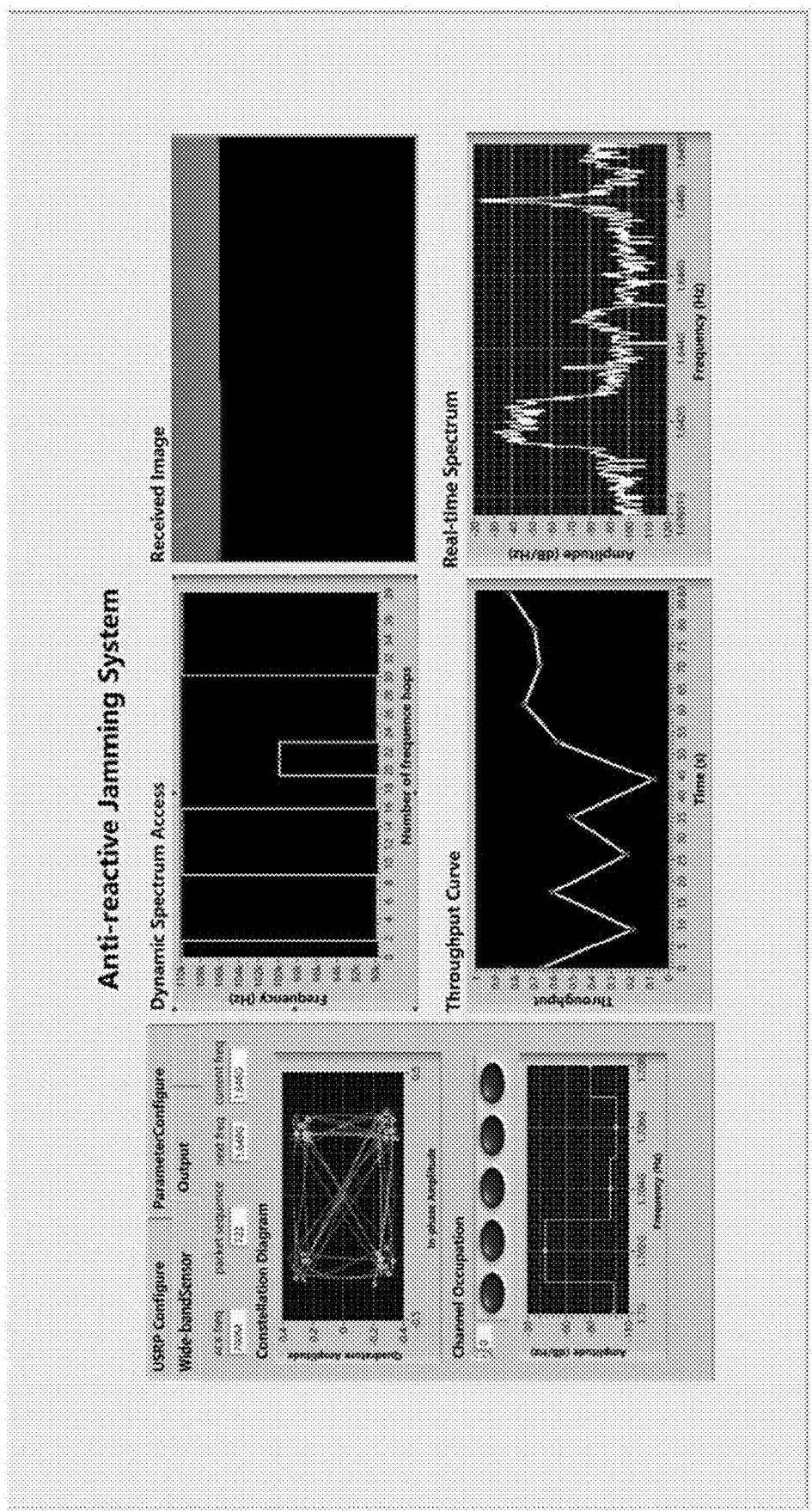
FIG. 5 is a schematic diagram of a LabVIEW interface for user communication effects of intelligent frequency hopping subject to sweep jamming according to the present disclosure.

FIG. 5 is a schematic diagram of a transmission effect of the transmitter, including a current image to be sent, internal parameter configurations, and a current access frequency band sequence.

In this embodiment, the step 3 may include:

Step 3.1: The frequency management center and the link-level USRP communication sub-user preset a format of exchanged information and set packet and unpacket interfaces uniformly based on the set format. Without loss of generality, if the UDP protocol is used for transmission, the parties need to address each other through specific IP addresses and port numbers to complete the communication.

Step 3.2: Registration process. In a system with multiple sub-users, each sub-user is registered to realize information exchange between all the sub-users in an orderly manner, thus ensuring the security and stability of information transmission.

Figure 7:
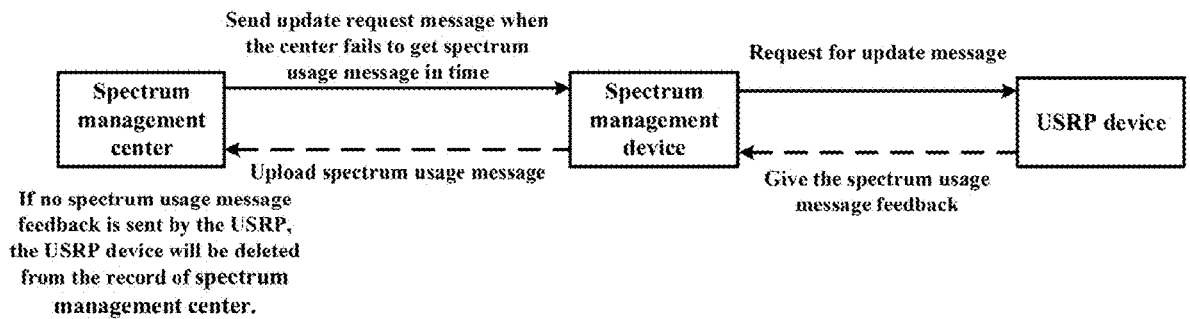
FIG. 7 is a flowchart of a procedure in which a frequency management network device processes an update request message according to the present disclosure.

Step 3.3: Process an update request message. FIG. 7 is a flowchart of processing the update request message.

Figure 8:
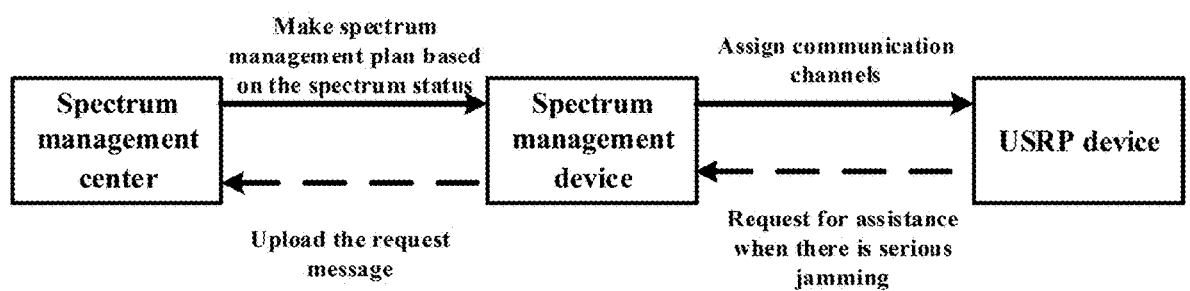
FIG. 8 is a flowchart of processing a spectrum management policy message and a frequency usage coordination message according to the present disclosure.

Step 3.4: Perform a frequency management policy and frequency usage coordination. FIG. 8 is a flowchart of processing a spectrum management policy message and a frequency usage coordination message.

In this embodiment, in the step 3.3, when a USRP communication node makes an autonomous decision, the USRP receiver receives the update request message sent by the frequency management center through the frequency management chain network, where the update request message is used by the frequency management center to request an updated frequency usage status from the USRP receiver. When no monitoring or frequency usage status message is received from a platform after expiration time, the update request message is sent for that platform, and then the receiver sends a monitoring result message and a frequency usage status message to the frequency management chain device.

In this embodiment, in the step 3.3, if response messages are received after four update requests, the frequency management center eliminates the platform device.

In this embodiment, in the step 3.4, the USRP transmitter node needs to send a frequency usage coordination message to the frequency management center through the frequency management chain network to inform the frequency management center of a current link-level jamming degree. In addition, when link-level communication is seriously jammed, the USRP transmitter actively sends a coordination request message to the frequency management center through the frequency management chain network. When receiving the frequency usage coordination message from the USRP transmitter, the frequency management center needs to determine whether to allocate a new available link-level frequency band based on the link-level jamming degree. When allocation is needed, the frequency management center sends a frequency management policy message to the USRP receiver and transmitter nodes through the frequency management chain network, and the USRP receiver and transmitter use an intelligent learning method to make an autonomous anti-jam decision in new spectrum resources based on the frequency management policy message.

Step 3: Set up the joint link-level and network-level hierarchical anti-jamming system.

Figure 6:
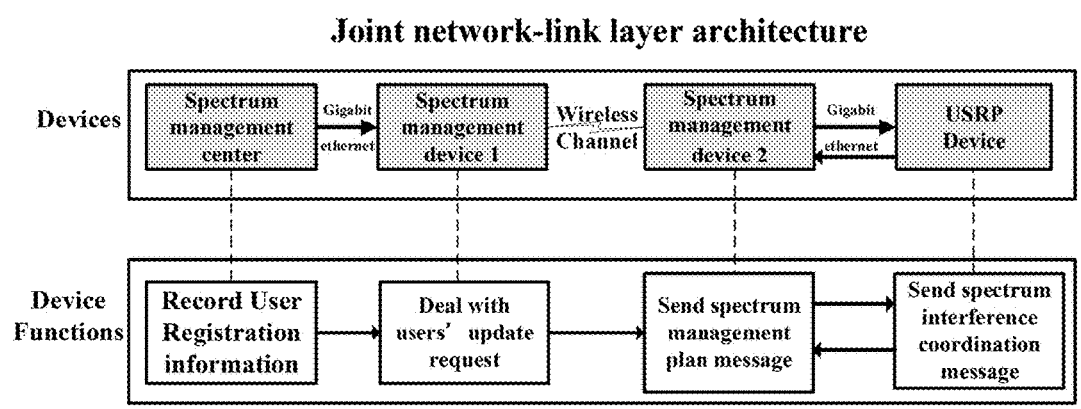
FIG. 6 is a diagram of a joint link-level and network-level spectrum resource management process according to the present disclosure.

FIG. 6 is a diagram of a joint link-level and network-level spectrum resource management process, mainly including registration, update request processing, and jamming coordination processing.

The process of joint link-level and network-level spectrum resource management is as follows: The frequency management center registers the USRP device into the network, and processes the USRP request message, and transmits the processing result to the corresponding frequency management chain device through the Ethernet. The frequency management chain device transmits the message to a frequency management chain device corresponding to the USRP through wireless transmission, and then the frequency management chain device receives the message and transmits the decision message of the frequency management center to the USRP through the Ethernet, completing a joint link-level and network-level spectrum resource management process. The frequency management center, a USRP transmitter, and a USRP receiver are all connected to a frequency management chain device through the Ethernet. Frequency management messages generated by the frequency management center, the USRP transmitter, and the USRP receiver are transmitted in UDP packets on an Ethernet link. When receiving the application for autonomous frequency usage coordination from the lower-level sub-user, the frequency management center can take an advantage of the strong sensing capability to reasonably reallocate autonomous decided bands for the lower-level sub-user.

FIG. 7 shows a procedure in which the frequency management network device processes the update request message. When the frequency management center receives no monitoring or frequency usage status message after the expiration time, the update request message is sent to the USRP device through the frequency management chain device, and the USRP device then uploads the monitoring result message or frequency usage status message to the frequency management center through the frequency management chain network. If the frequency management center receives responses after sending four update requests, the device is eliminated from the network.

FIG. 8 shows a procedure of processing the spectrum management policy message and the frequency usage coordination message. When the USRP is seriously jammed, the frequency management chain device sends the frequency usage coordination request message to the frequency management center. The frequency management center prepares the frequency management policy based on the current spectrum status, and the policy is sent to the USRP through the frequency management chain network, completing processing of the frequency usage coordination message.

The frequency management center senses the spectrum in the entire current environmental to obtain the power corresponding to each frequency of the current communication environment. The frequency management center performs frequency usage coordination for the lower-level sub-users accordingly to reasonably allocate communication frequency bands and uses dedicated channels to inform the lower-level communication transmitters and receivers of the new chain-building frequency to re-establish communication transmission links.

Simulation parameter settings are shown in Table 1:

TABLE 1

Parameter configuration table of a joint link-level and network-level intelligent system for dynamic spectrum anti-jamming

| Variable | Parameter setting |
|---|---|
| Link-level decision channel number | M = 5 |
| Link-level decision channel bandwidth | 2 MHz |
| Network-level decision frequency band range | 900 MHz-1600 MHz |
| Learning rate | $\alpha = 0.3$ |
| Discount factor | $\gamma = 0.7$ |
| Boltzmann factor | $\beta = 5$ |
| Data transmission time | $T_d = 0.45$ |
| Wideband spectrum sensing time | $T_{WBSS} = 0.06$ s |
| ACK feedback time | $T_{ACK} = 0.06$ s |
| Data sampling rate | 1M Samples/s |
| Modulation scheme | QPSK |
| Antenna gain | 15 dB |

Figure 4:
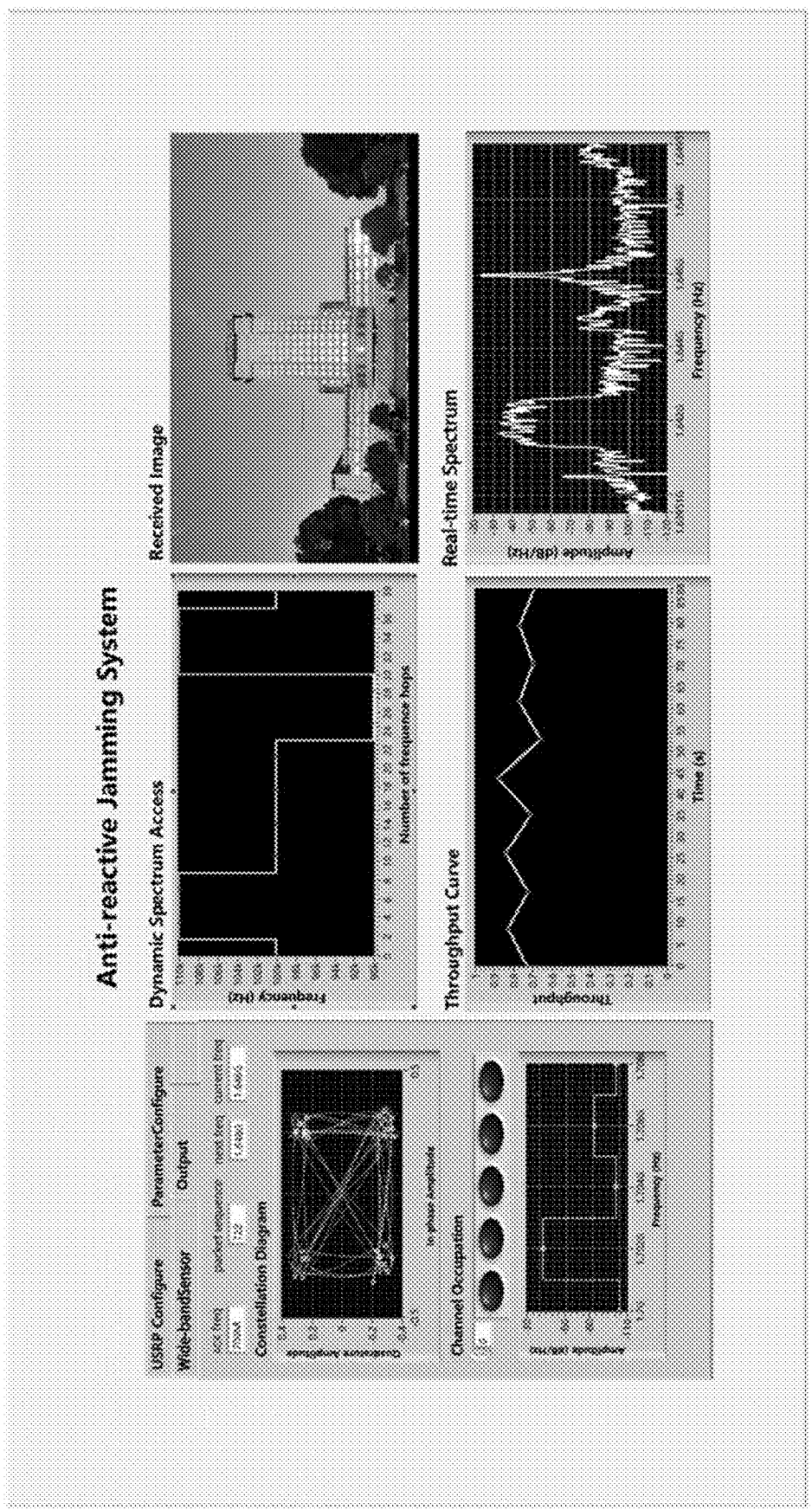
FIG. 4 is a schematic diagram of a LabVIEW interface for user communication effects of frequency hopping based on sensing subject to sweep jamming according to the present disclosure.

Simulation Result Analysis:

FIG. 4 is a schematic diagram of an interface for fixed-frequency user communication effects subject to sweep jamming. When the user is maliciously jammed, the information transmission hit error rate is high, the image transmission quality is poor, the packet loss rate reaches 15%, and the average throughput is only 55% of the theoretical maximum throughput.

FIG. 5 is a schematic diagram of an interface for user communication effects of intelligent frequency hopping subject to sweep jamming. The user makes intelligent frequency usage decision through the reinforcement learning method to avoid malicious jamming. The image transmission is clear and smooth, the packet loss rate of 1.8%, and the average throughput reaches 88% of the theoretical maximum throughput.

Figure 9:
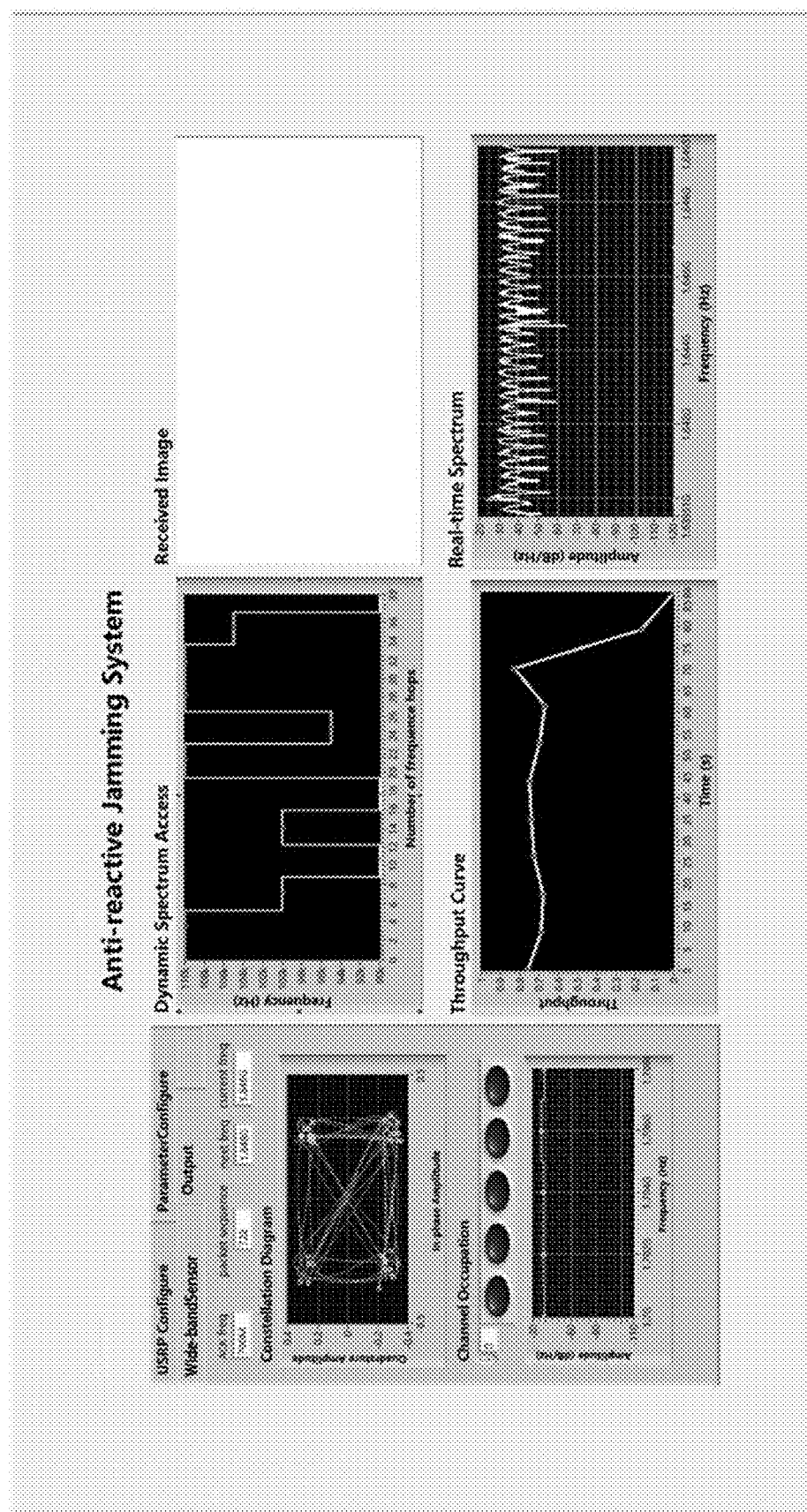
FIG. 9 is a schematic diagram of a LabVIEW interface for user communication effects when a determined frequency band is completely jammed according to the present disclosure.

FIG. 9 is a schematic diagram of an interface for user communication effects when a decided frequency band is completely jammed. When the link-level sub-user is seriously jammed, the sub-user cannot avoid the jamming through intelligent decision, and the information transmission bit error rate is high, the image transmission is stalled, the packet loss rate is 99%, and the average throughput is only 0.3% of the theoretical maximum throughput.

Figure 10:
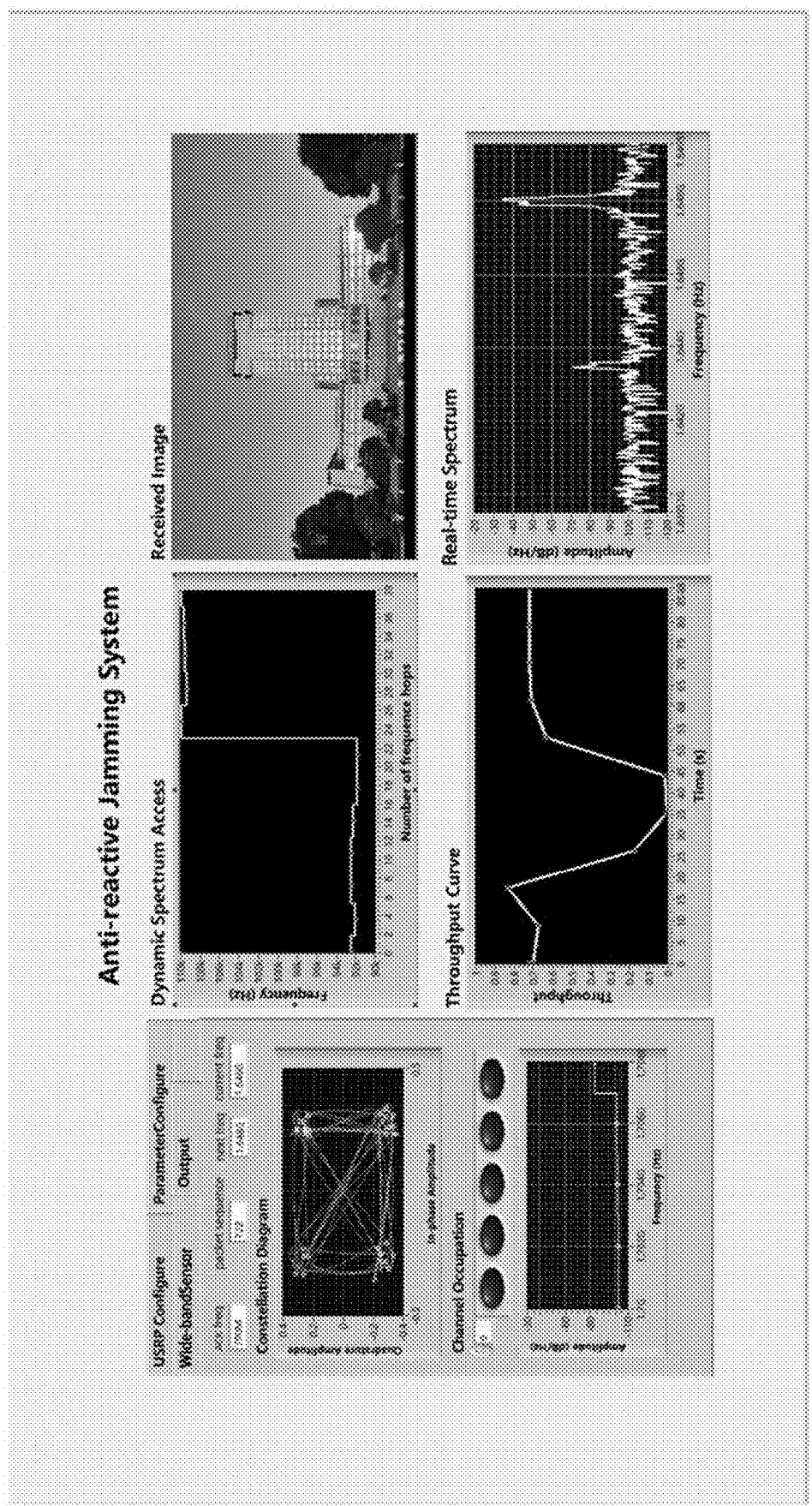
FIG. 10 is a schematic diagram of a LabVIEW interface for user communication effects after network-level coordination for frequency band decision according to the present disclosure.

FIG. 10 is a schematic diagram of an interface for user communication effects after network-level coordination for frequency band decision. After requesting the network-level frequency management center to reallocate the available frequency band, the sub-user makes an autonomous decision on the new frequency band, and the image transmission is clear and smooth, the packet loss rate is 1.5%, and the average throughput is 89% of the theoretical maximum throughput.

Table 2 shows a performance indicator table of decision time of the joint link-level and network-level intelligent system for dynamic spectrum anti-jamming, showing that the average total time of the link-level user for each sensing, frequency hopping, and transmission is 0.54 s. In case of network-level anti-jamming, the average time of the user from sending the frequency usage coordination request to the frequency management center to shifting to the decided frequency band is 0.86 s.

TABLE 2

Performance indicator table of decision time of the joint link-level and network-level intelligent system for dynamic spectrum anti-jamming

| Performance indicators | Description | Test quantity | Test result |
|---|---|---|---|
| Link-level frequency usage decision time | Average total time of the link-level user for each sensing, hopping, and transmission | 1000 | 0.54 s |
| Network-level frequency coordination time | Average time of the user from sending frequency usage coordination request to shifting to the decided frequency band | 500 | 0.86 s |

In summary, in the present disclosure, the users make intelligent frequency usage decisions through the dynamic spectrum anti-jamming algorithm based on reinforcement learning to effectively avoid external malicious jamming, realize dynamic spectrum access, and enhance the frequency domain anti-jamming capability of the system. In addition, the network-level anti-jamming subsystem is added to the link-level anti-jamming subsystem, and an upper-level frequency management center is deployed. In case of strong malicious wideband jamming, the network-level anti-jamming is used, and the advantages, such as the strong sensing ability of the frequency management center, are used to allocate and manage the spectrum resources for the lower-level sub-users to further enhance the frequency domain anti-jamming capability of the system.

The above described are only preferred implementations of the present disclosure, and the scope of the present disclosure is not limited thereto. All technical solutions based on the idea of the present disclosure should fall within the protection scope of the present disclosure. It should be noted that several modifications and adaptations made by those of ordinary skill in the art without departing from the principle of the present disclosure should fall within the scope of protection of the present disclosure.

What is claimed is:

1. A joint link-level and network-level intelligent system for a dynamic spectrum anti-jamming, comprising a link-level anti-jamming subsystem and a network-level anti-jamming subsystem, wherein the link-level anti-jamming subsystem sets a reward value as a system transmission throughput in a single decision cycle, and a user makes an intelligent frequency usage decision based on the reward value to skip a frequency band where an external malicious jamming exists to avoid impact of the external malicious jamming;

the network-level anti-jamming subsystem performs a reasonable frequency band allocation and management for a lower-level sub-user when a link-level anti-jamming fails to further enhance a frequency domain anti-jamming capability of the joint link-level and network-level intelligent system; and packet and unpacket modules are correspondingly provided at a frequency management center and a sub-user node to guarantee a smooth information transmission.

2. The joint link-level and network-level intelligent system according to claim 1, wherein the link-level anti-jamming subsystem comprises a transmitter provided at a learning node, a receiver provided at a cognitive node, and a jammer, wherein the jammer is configured to generate a swept jamming signal, a comb jamming signal and a random jamming signal;

the transmitter and the receiver transmit a data frame through a data link and the transmitter and the receiver transmit control information through a control link; and the receiver obtains channel information through the control link and a wideband spectrum sensing, and the receiver is configured with the channel information to execute a reinforcement learning algorithm to optimize a channel selection strategy.

3. The joint link-level and network-level intelligent system according to claim 2, wherein the link-level anti-jamming subsystem is configured with a laboratory virtual instrument engineering workbench (LabVIEW) development environment and a universal software radio peripheral (USRP) device for a wireless signal transmission and a jamming signal generation;

the frequency management center communicates with the lower-level sub-user through a frequency management chain network; and the frequency management center, a USRP transmitter, and a USRP receiver are connected to a frequency management chain device through Ethernet, and frequency management messages are transmitted in user datagram protocol (UDP) packets on an Ethernet link, wherein the frequency management messages are generated by the frequency management center, the USRP transmitter, and the USRP receiver.

4. The joint link-level and network-level intelligent system according to claim 1, wherein the network-level anti-jamming subsystem comprises an upper-level frequency management center, and the upper-level frequency management center learns available spectrum resources in an environment through a wideband spectrum sensing, and the frequency management center confirms a requirement of the lower-level sub-user; and the sub-user node sends a frequency usage coordination request to the frequency management center when the link-level anti-jamming fails, wherein allocated spectrum resources fail to meet communication needs of the sub-user node; and the frequency management center allocates spectrum resources for the lower-level sub-user after receiving the frequency usage coordination request, the frequency management center sends an allocation scheme to the sub-user node and the frequency management center establishes a backup spectrum resource pool with unused spectrum resources to handle needs of the sub-user node with an exceptional case.

5. An intelligent method for dynamic spectrum anti-jamming based on the joint link-level and network-level intelligent system according to claim 1, comprising:

step 1: when the lower-level sub-user is subject to a jamming, sensing, by the link-level anti-jamming subsystem, a gain of the frequency band in an environment through a wideband spectrum sensing machine to obtain a jamming strength in the environment, learning a frequency hopping pattern of the jamming through a reinforcement learning algorithm, and setting a reward value of a communicating user as the system transmission throughput in the single decision cycle;

step 2: upgrading, by the joint link-level and network-level intelligent system to a joint link-level and network-level anti-jamming, wherein applying, by the lower-level sub-user, to an upper-level frequency management center of the network-level anti-jamming subsystem for an autonomous decision of a frequency usage coordination when a link-level autonomous frequency usage decision fails, wherein a communication of the lower-level sub-user is interrupted in case of a strong wideband jamming, and even the intelligent frequency usage decision made by the link-level anti-jamming subsystem fails to avoid an impact of the jamming, and updated communication frequency information fails to be internally exchanged; and step 3: sensing, by the frequency management center, available spectrum resources in the environment, activating a pre-decided spare spectrum, allocating the frequency band to the lower-level sub-user, and using a dedicated channel to inform each of two users in a lower-level communication pair of a new link-building frequency.

6. The intelligent method according to claim 5, wherein step 3 comprises:

step 3.1: presetting, by the frequency management center and a link-level communication sub-user, a format of exchanged information, and setting, packet and unpacket interfaces based on the format;

step 3.2: registering the link-level communication sub-user;

step 3.3: processing an update request message; and step 3.4: performing a frequency management policy and the frequency usage coordination.

7. The intelligent method according to claim 6, wherein in step 3.3, when a communication node makes an autonomous decision, a receiver receives the update request message sent by the frequency management center through a frequency management chain network, wherein the update request message is configured by the frequency management center to request an updated frequency usage status from the receiver; when no monitoring message or no frequency usage status message is received from a platform after an expiration time, the update request message is sent for the platform, and the receiver sends a monitoring result message and a frequency usage status message to a frequency management chain device.

8. The intelligent method according to claim 6, wherein in step 3.4, a transmitter is configured to send a frequency usage coordination message to the frequency management center through a frequency management chain network to inform the frequency management center of a link-level jamming degree; wherein when a link-level communication is jammed, the transmitter actively sends a coordination request message to the frequency management center through the frequency management chain network; when the frequency management center receives the frequency usage coordination message from the transmitter, the frequency management center is configured to determine whether to decide a new available link-level frequency band based on the link-level jamming degree; and when decision is needed, a frequency management policy message is sent to the receiver and the transmitter through the frequency management chain network, and the receiver and the transmitter are configured with an intelligent learning method to make an autonomous anti-jamming decision in new spectrum resources based on the frequency management policy message.

9. The intelligent method according to claim 5, wherein in the joint link-level and network-level intelligent system, the link-level anti-jamming subsystem comprises a transmitter provided at a learning node, a receiver provided at a cognitive node, and a jammer, wherein
the jammer is configured to generate a swept jamming signal, a comb jamming signal and a random jamming signal;
the transmitter and the receiver transmit a data frame through a data link and the transmitter and the receiver transmit control information through a control link; and
the receiver obtains channel information through the control link and a wideband spectrum sensing, and the receiver is configured with the channel information to execute the reinforcement learning algorithm to optimize a channel selection strategy.

10. The intelligent method according to claim 9, wherein in the joint link-level and network-level intelligent system, the link-level anti-jamming subsystem is configured with a LabVIEW development environment and a USRP device for a wireless signal transmission and a jamming signal generation;
the frequency management center communicates with the lower-level sub-user through a frequency management chain network; and
the frequency management center, a USRP transmitter, and a USRP receiver are connected to a frequency management chain device through Ethernet, and frequency management messages are transmitted in UDP packets on an Ethernet link, wherein the frequency management messages are generated by the frequency management center, the USRP transmitter, and the USRP receiver.

11. The intelligent method according to claim 5, wherein in the joint link-level and network-level intelligent system, the network-level anti-jamming subsystem comprises the upper-level frequency management center, and the upper-level frequency management center learns the available spectrum resources in the environment through a wideband spectrum sensing, and the frequency management center confirms a requirement of the lower-level sub-user; and
the sub-user node sends a frequency usage coordination request to the frequency management center when the link-level anti-jamming fails, wherein allocated spectrum resources fail to meet communication needs of the sub-user node; and the frequency management center allocates spectrum resources for the lower-level sub-user after receiving the frequency usage coordination request, the frequency management center sends an allocation scheme to the sub-user node and the frequency management center establishes a backup spectrum resource pool with unused spectrum resources to handle needs of the sub-user node with an exceptional case.

* * * * *